Nov. 27, 1928.

N. W. HENDRYX

BIRD CAGE 1,692,835

Filed Sept. 1, 1925    2 Sheets-Sheet 1

Inventor
Nathan W. Hendryx
By Henry E. Goodwell
Attorney

Nov. 27, 1928.
N. W. HENDRYX
BIRD CAGE
Filed Sept. 1, 1925  2 Sheets-Sheet 2
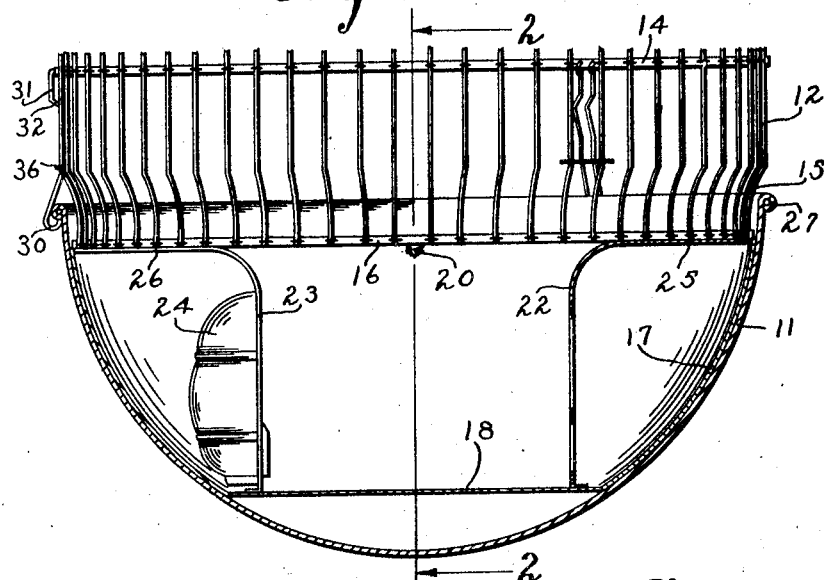
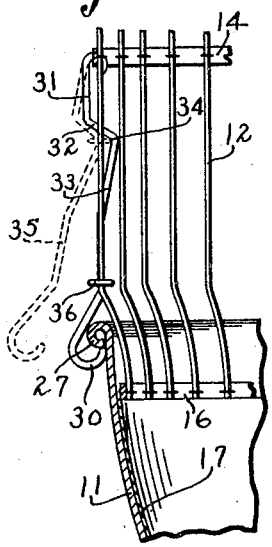
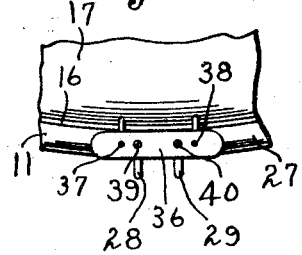
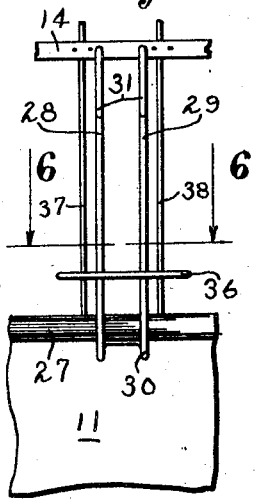

Patented Nov. 27, 1928.

1,692,835

UNITED STATES PATENT OFFICE.

NATHAN W. HENDRYX, OF NEW HAVEN, CONNECTICUT, ASSIGNOR TO THE ANDREW B. HENDRYX COMPANY, OF NEW HAVEN, CONNECTICUT.

BIRD CAGE.

Application filed September 1, 1925. Serial No. 53,903.

This invention relates to bird cages, and more especially to a cage of this character designed for household use, and provided with a lower shield or bottom portion, wherein the food and water receptacles are disposed so as to be normally concealed from view. This shield portion of such a cage is usually provided with a bead or similar projection at its upper edge whereby it may be held in engagement with the body or barred portion of the cage by suitable hooks or catches.

Moreover in this type of cages, a pan or mat is usually seated within the lower shield, this pan being removable, and in the illustrated form of my invention is provided with means for supporting the food and water receptacles. Due to the shape of the shield, the mat may sometimes become displaced therein and one of the advantages of the present construction is the provision of means for centering this mat or securing it in the proper position within the lower portion of the cage.

One object of my invention is the provision of hooks or catches of novel form for securing the upper or barred portion of the cage to the lower or bottom portion thereof.

Another object of my invention is to provide suitable catches for securing the upper and lower portions of the cage together, such that these catches may be readily and easily manipulated in operative position, and which, when in operative position, will hold the two parts of the cage firmly together.

A further object of my invention consists in so arranging the upper and lower parts of the cage and the mat disposed therein that this mat will be held in its proper position when the two portions of the cage are assembled or secured together, and will be automatically centered with respect to the bottom portion of the cage.

A still further object of the invention consists in arranging the heretofore described parts of the bird cage, such that when the upper and lower parts thereof are secured together, the mat will be firmly held between these parts.

To these and other ends, the invention consists in the novel features and combinations of parts to be hereinafter described, and claimed.

In the accompanying drawings:

Fig. 3 is a view similar to Fig. 2, but taken at right angles thereto, on line 3—3 of Fig. 2;

Fig. 4 is an enlarged fragmentary sectional view showing the catch mechanism for securing the two parts of the cage together;

Fig. 5 is an elevational view of the catch mechanism;

Fig. 6 is a sectional view on line 6—6 of Fig. 5.

Figure 1:
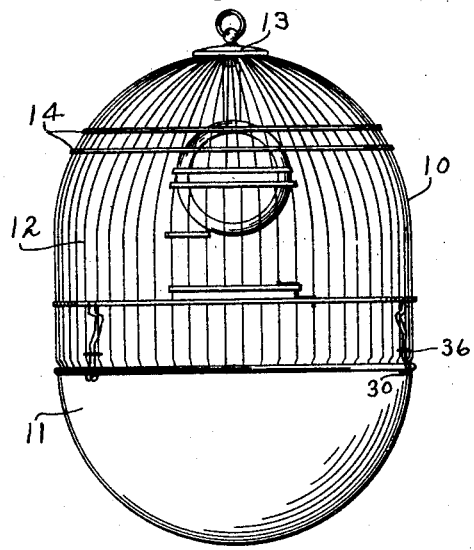
Fig. 1 is the side elevational view of a bird cage, embodying my invention.

The preferred embodiment of my invention which I have selected to illustrate and describe in the drawings, comprises a cage having an upper or barred portion 10, and a lower or shield portion 11, the latter being preferably formed of opaque material so as to conceal the food and water receptacles disposed therein, and also preferably is substantially bowl-shaped in form so that the cage as a whole will have attractive lines and present an ornate and graceful appearance.

The upper portion 10 of the cage comprises vertically disposed bars 12 substantially parallel for the greater part of their length, converging at the top toward the tip 13, and horizontally disposed rails 14. At its lower end, this portion of the cage is slightly reduced in diameter by offsetting the lower ends of the bars as shown at 15 so that the rail 16 at the lower ends of these bars will be sufficiently small in diameter to enter the upper part of the bowl-shaped shield 11.

Figure 2:
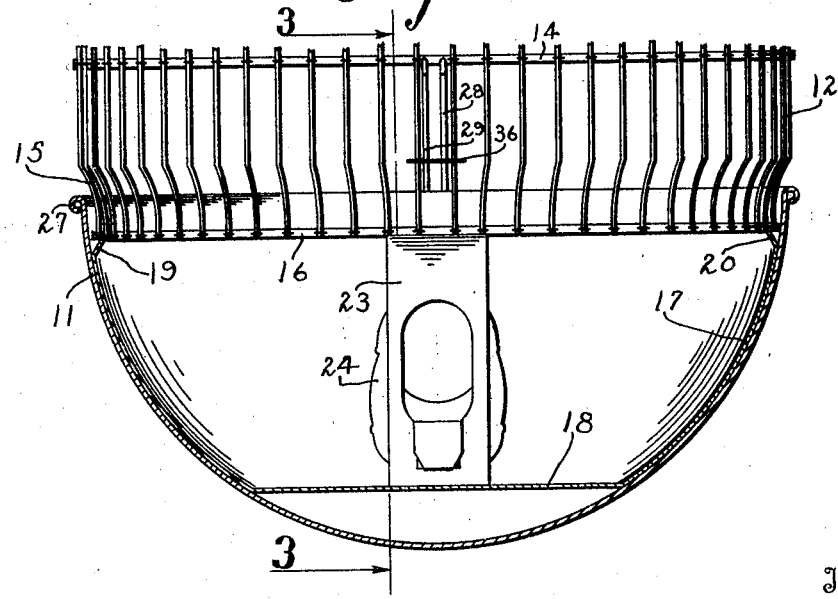
Fig. 2 is the sectional view of the lower portion of the cage taken on line 2—2 of Fig. 3.

As shown in Figs. 2 and 3, within this shield is a pan or mat 17 of a shape to correspond with that of the shield except that in the form shown in the drawing it is provided with a flat bottom 18. As this mat and the shield are substantially spherical in shape, it will be apparent that the mat is free to move to some extent within the shield; that is, one edge thereof may ride upwardly while the opposite edge would move downwardly, so that this mat would not be properly centered within the member 11. The centering of this mat is accomplished in my improved cage by confining the mat between the upper and lower portions of the cage. As the material of which the mat is made is relatively thin, and for that reason the rail 16 might in some instances pass by the upper edge of the mat, inwardly extending projections 19 and 20 are provided at the upper edge thereof, these projections being of such size and shape that they will always catch below the rail 16 and prevent its farther entrance into the shield. As shown in the drawings, only two of such projections are provided, these preferably being opposed diametrically of the mat.

Within the mat 17 are secured L-shaped supporting members 22 and 23 which are designed to support the food receptacles 24 in an upright position so that such receptacles are within the shield portion of the cage, and are normally concealed from view. The upper or horizontally disposed portions 25 and 26 of these members will, when the two parts of the cage are assembled, be engaged by the lower rail 16 of the upper part of the cage, and co-operate with the projections 19 and 20 to hold the mat centered within the shield. For this reason, the projections 19 and 20 are formed at portions of the mat quadrantally spaced from the supporting members 22 and 23. These projections 19 and 20 may be made by displacing inwardly the upper edge of the wall of the mat.

To detachably secure the upper barred portion of the cage to the lower shield, hook members are provided, the lower ends of which are adapted to engage below an external peripheral bead 27, formed on the upper edge of the shield member. These hook members are generally U-shaped in form and consist of the body portions 28 and 29 connected at their lower ends by the bight portion 30 which is in the form of a hook. The upper ends of these members are loosely pivoted to one of the rails 14 so that they enjoy a swinging motion about their connections with this rail. The members 28 and 29 are substantially parallel and consist of a number of sections each disposed at an angle to the preceding section so that, as will be described hereinafter, the hooks may be securely held in place and at the same time readily moved to inoperative positions. At the upper end of each of these members is a substantially vertical portion 31, below which is a part 32 extending inwardly at a sharp angle to the part 31. Below this inwardly inclined portion 32, is an outwardly inclined section 33, which makes a sharp angle with the part 32, resulting in the formation of the vertex 34, and below the part 33 is a substantially vertical or upright portion 35 which is adjacent to and joins the lower hook portion 30. A catch member or slide 36 is slidably mounted upon two adjacent bars 37 and 38, and also, as clearly shown in Fig. 6, slidably receives the members 28 and 29 in perforations 39 and 40 provided therein.

When the catch member is in its lower position, as shown in full lines in Fig. 4, this member will be engaged with the vertical part 35 of the hook member and will retain the hook 30 in its inward position below the bead 27, so as to firmly secure the barred portion of the cage to the lower shield. When the catch member 36 is raised, its upward movement takes place with substantially no positive action until it encounters the inclined parts 33 of the hook member, when, due to the inclination of these parts, the hook will be moved outwardly as the catch member moves upwardly, until the former is disengaged from the bead and releases the shield. The catch member may then be moved upwardly until it rests in the angle 34 where it will be stopped by engaging the sharply inclined portion 32. When the catch member is moved downwardly the reverse result is obtained and the hook members are cammed inwardly below the bead, the parts 33 acting as cam surfaces to accomplish this function. When the catch member is in its lower position, as previously stated, it is in engagement with the vertical parts 35 of the hook members so that there will be no tendency for the catch to be cammed upwardly and the parts of the cage to become detached. The result is that while this catch member is quite readily manipulated so as to secure or release the shield portion of the cage it will tend to be retained automatically in either position to which it is moved.

Moreover, when the two parts of the cage are secured together, the lower rail 16 of the barred portion of the cage will, as previously stated, rest upon the horizontal portions 25 and 26 of the receptacle supporting members, and upon the projecting members 19 and 20 so as to keep the mat 17 clamped between the two parts of the cage and properly centered within the shield member.

While I have shown and described a preferred embodiment of my invention, it will be understood that it is not to be limited to all the details shown, but is capable of modification and variation within the spirit of the invention, and within the scope of the appended claims.

What I claim is:

1. A bird cage having a body portion of spaced bars suitably secured together, and a base portion of bowl shape form, the lower portion of the body of the cage being offset inwardly to enter the upper portion of the bowl shaped base, a mat within the base and supported thereby, and means for securing the body portion of the cage to the base with the lower offset portion of the body engaging the upper edge of the mat to secure it in place.

2. A bird cage comprising a lower bowl shaped base, and a body having a portion of substantially the same diameter as the upper edge of the base, the lower end portion of the body being restricted in diameter so as to enter the upper part of the base, a bowl shaped mat within the base and resting against the wall thereof, and means for securing the body portion of the cage to the base with the lower restricted part of the body engaging the upper edge of the mat to center it within the base and hold it in place.

3. A bird cage comprising a lower bowl shaped base, and a body having a portion of substantially the same diameter as the upper edge of the base, the lower end portion of the body being restricted in diameter so as to enter the upper part of the base, a bowl shaped mat within the base and resting against the wall thereof, and means for securing the body portion of the cage to the base with the lower restricted part of the body engaging the upper edge of the mat to center it within the base and hold it in place, said means including an outwardly projecting bead upon the base, and a hook member secured to the body portion of the cage and adapted to engage said bead.

4. A bird cage comprising a bowl shaped base portion the wall of which has a smooth unbroken inner surface, a correspondingly shaped mat mounted within said base, a barred body portion of substantially the same diameter as the upper edge of the base but having its lower end offset inwardly to enter the base to a limited extent, and means for securing the body and base together with the lower end of the body portion within the base and engaging the mat to center it and hold it in place.

5. A bird cage comprising a body portion and a bowl-shaped base adapted to be detachably secured thereto, a correspondingly shaped mat within the base, the lower end of said body portion being received within and below the upper peripheral edge of said base to engage the upper portion of the mat and center it within the base.

6. In a bird cage, a body portion and a bowl-shaped base adapted to be detachably secured to the body portion, a bowl-shaped mat disposed within the base, and means for securing the body portion to the base with the lower edge of the former below the peripheral edge of the base and engaging the upper end of the mat to center the latter within the base.

7. In a bird cage, a body portion and a bowl-shaped base adapted to be detachably secured thereto, a correspondingly shaped mat within the base, the lower edge of said body portion being adapted to be received within the base to engage the mat to center the latter within the base, and the upper portion of said mat being provided with inwardly projecting members with which the base may engage.

8. In a bird cage, a body portion and a lower bowl-shaped base portion, a correspondingly shaped mat within the base portion, means secured to said mat to support a receptacle or the like, and means for clamping the body portion of the cage to the base so that the lower portion thereof enters the bowl shaped base and engages said receptacle holding means to center the mat within the base.

9. In a bird cage, a body portion, a hollow base portion and a mat resting against the inner side wall of the base, said mat having an upwardly directed side wall, the upper edge of which is displaced inwardly to provide projections with which the body portion of the cage may engage.

10. In a bird cage, a body portion and a bottom portion, a mat within the bottom portion of the cage provided with receptacle holding means and with projections upon its wall, and means to clamp the body portion of the cage to the bottom portion with the former engaging said receptacle holding means and said projections to position the mat within the cage.

11. A bird cage comprising a body portion and a lower bottom portion provided with a projecting flange, and means for securing said parts detachably together, comprising a hook member swingably secured to the body portion of the cage and having a cam-shaped portion and a member slidably mounted on the cage and engaging said portion to cam said hook into engagement with the flange.

12. In a bird cage, a body portion and a bottom portion having a projecting flange, a hook member swingably secured to the body portion of the cage, and means engaging the member to positively move it into and out of engagement with said flange.

13. In a bird cage, a body portion and a bottom portion having a projecting flange, a hook member swingably secured to the body portion of the cage, and means movably mounted upon the cage body and connected to said member to positively force it into and out of engagement with said flange.

14. In a bird cage, a body portion and a bottom portion having a projecting flange, a hook member swingably secured to the body portion of the cage, a slide movably mounted on the body portion of the cage and connected to said member to positively force it into and out of engagement with said flange.

15. In a bird cage, a barred body portion and a bottom portion having a projecting flange, a hook member connected to the body portion of the cage and having a hook at its lower end to engage said flange, and a slide movably mounted on said cage bars and connected to said hook to positively move it into and out of engaging position.

16. A bird cage, comprising an upper body portion and a lower base portion, and means to secure said members together, comprising a hook member swingably mounted to the body portion of the cage and comprising a U-shaped member bent in the form of a hook and a cam-shaped body portion, a slide secured to the bars of the cage and engaging the body portion of said hook to positively move it into and out of engaging position.

In witness whereof, I have hereunto set my hand this 27th day of August, 1925.

NATHAN W. HENDRYX.